Figure 1:
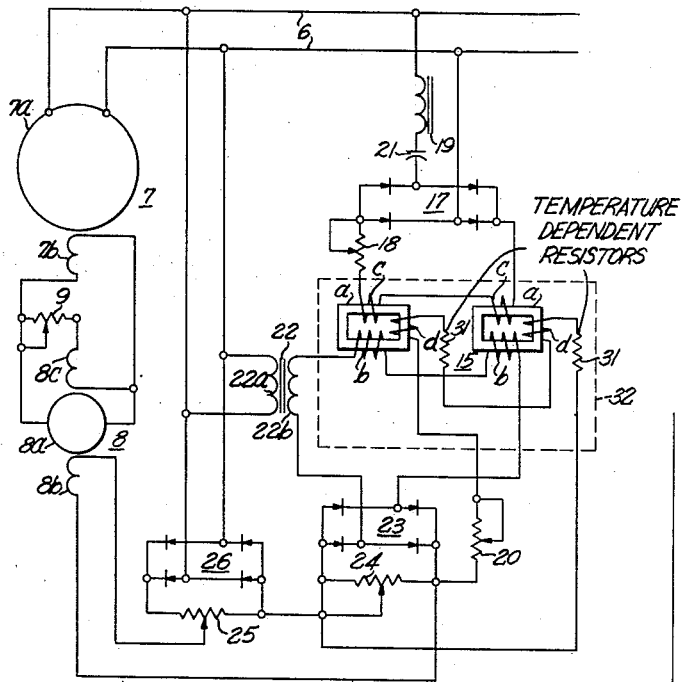

Aug. 10, 1954    R. A. GERG    2,686,287

TEMPERATURE COMPENSATED ELECTRIC REGULATING SYSTEM

Filed March 28, 1951

Inventor
Robert A. Gerg
by Walter S. Madden, Jr.
Attorney

Patented Aug. 10, 1954

2,686,287

UNITED STATES PATENT OFFICE 2,686,287

TEMPERATURE COMPENSATED ELECTRIC REGULATING SYSTEM

Robert A. Gerg, Milwaukee, Wis., assignor to Allis-Chalmers Manufacturing Company, Milwaukee, Wis.

Application March 28, 1951, Serial No. 217,930

7 Claims. (Cl. 322—23)

This invention relates in general to electric regulating systems and in particular to means for compensating for the effects of temperature changes on such systems.

It is well known that the resistance of most current carrying electrical elements varies with variations in the temperature of the element. This resistance variation is positive for most elements, that is, the resistance increases as the temperature increases, and such resistance variations produce an undesirable effect on systems utilizing such elements. This is especially true of exciter generators having self-energized field windings adjusted to provide all of the excitation required to maintain the voltage of the generator at any given value.

If the field resistance line of such a generator is adjusted to coincide with the saturation curve of the machine, thereby providing one hundred percent self-excitation, before the generator has reached its operating temperature, increases in the resistance of the field winding occasioned by increases in the temperature of the machine and field winding, shift the field resistance line from its original position so that the machine is not fully self-excited when it reaches its operating temperature. This necessitates either readjusting the field resistance after the machine reaches its operating temperature or displacing the field resistance line from the saturation curve when the machine is started and permitting the resistance change caused by temperature variations to shift the field resistance line into coincidence with the saturation curve when the machine reaches operating temperature. Both of these methods are objectionable where highly accurate, fully automatic regulating systems are desired, and have the additional disadvantage that variations in the ambient temperature of the machine necessitate additional adjustment of the system.

Additionally, in systems having a plurality of electrical elements having positive temperature coefficients of resistance, it has been necessary heretofore to provide a plurality of compensating means for eliminating the effects of resistance variations with temperature changes. This disadvantage may be overcome by utilizing one common compensating means to compensate for the effects of related temperature changes on the plurality of elements.

It is therefore an object of this invention to provide an improved electric regulating system having means for compensating for the effects of temperature variations therein.

It is an additional object of this invention to provide an electric regulating system in which one compensating means compensates for resistance variations caused by related temperature changes in a plurality of electrical elements.

It is an additional object of the present invention to provide an electric regulating system utilizing self-excited generators in which the generators are fully self-excited independently of the temperatures of the generators.

Figure 2:
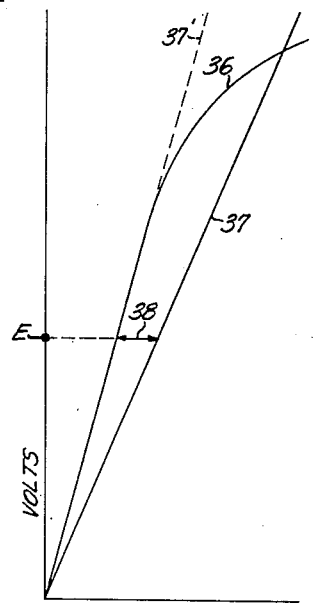
Figure 3:
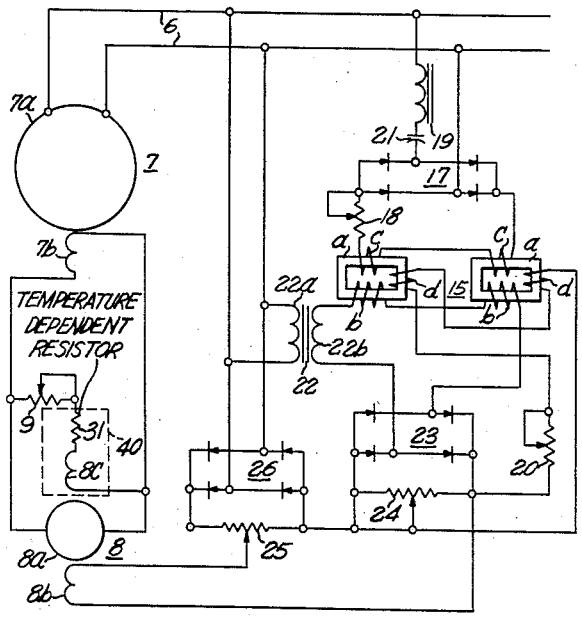

Objects and advantages other than those set forth above will be apparent from the following description when read in connection with the accompanying drawing, in which:

Fig. 1 diagrammatically illustrates the circuits and apparatus of one embodiment of the invention;

Fig. 2 is a group of curves illustrating the operation of some of the elements of Fig. 1; and Fig. 3 diagrammatically illustrates the circuits and apparatus of an alternate embodiment of the invention.

As shown in Fig. 1, one embodiment of the invention is illustrated in connection with the control of an operating condition of an electric network represented by conductors 6. Conductors 6 are supplied from the armature 7a of an alternating current generator 7 having a field winding 7b. Field winding 7b is energized from a suitable controllable source of direct current such as the armature 8a of an exciter generator 8. Generator 8 is provided with a control field winding 8b and a self-energized field winding 8c connected in circuit with armature 8a; for instance, field winding 8c may be connected across armature 8a in series with an adjustable resistor 9 to form a first circuit. Field windings 8b, 8c comprise field winding means for controlling the voltage of their associated armature. It will be understood that the number of exciter generators utilized is dependent upon the desired power amplification of the signal input.

Control field winding 8b may be connected to suitable means responsive to the operating condition being controlled. If it is desired to maintain the voltage of the network represented by conductors 6 substantially constant at a predetermined value, field winding 8b may be connected to condition responsive means including a saturable reactor 15 having a pair of saturable cores 15a, a reactance winding 15b divided into two portions severally wound on the two cores, a control winding 15c likewise divided into two portions and a feedback winding 15d composed of two portions. A full wave rectifier 17 having its alternating current terminals connected to conductors 6 impresses on control winding 15c and an adjustable resistor 18 a unidirectional voltage proportional to the voltage of conductors 6 to vary the saturation of reactor 15 in response to variations in the voltage of conductors 6. An inductive reactor 19 and a capacitor 21 may be serially connected between rectifier 17 and conductors 6 to compensate for the effect on reactor 15 of variations in the frequency of the voltage of conductors 6.

Reactance winding 15b is energized from the secondary winding 22b of a transformer 22 having a primary winding 22a connected to conductors 6 and causes the voltage impressed on the alternating current terminals of a full wave rectifier 23 from transformer 22 to be a measure of the voltage of conductors 6. The direct current terminals of rectifier 23 are connected to an adjustable resistor 24 to impress thereacross a voltage which is a further measure of the voltage of conductors 6. The voltage of resistor 24 is compared with a suitable reference voltage, such as a voltage proportional to the voltage of conductors 6 impressed across a voltage divider 25 from a full wave rectifier 26 connected to conductors 6. One terminal of divider 25 is connected to a terminal of like polarity of resistor 24 and the noncommon terminals of elements 24, 25 are connected to control field winding 8b to impress thereacross a voltage equal to the difference between the voltages of elements 24, 25.

Feedback winding 15d is connected in series with an adjustable resistor 20 across resistor 24 to impress on winding 15d a feedback voltage proportional to the voltage of resistor 24, and winding 15d is so wound and connected that the current therethrough is cumulative with the current in control winding 15c in saturating cores 15a.

Suitable temperature compensating means are provided and such means may comprise resistance means in the form of resistors 31 connected in circuit with feedback winding 15d. Thus, resistors 31 are connected to the circuit comprising field winding 8b, voltage divider 25 and resistor 24. Resistors 31 have negative temperature coefficients of resistance, that is, their resistance decreases with increases in temperature of the resistors, and the resistors may be of the type known as "thermistors." Resistors 31 are subjected to a temperature in a predetermined relation to the temperature of the electrical element or elements which it is desired to compensate, and in the embodiment of Fig. 1, resistors 31 are embedded in reactor 15 or otherwise placed in heat transfer relation therewith, as diagrammatically represented by the enclosure 32.

In operation of the system, neglecting for the moment the effect of temperature changes on the resistance of the electrical elements having positive temperature coefficients of resistance and the compensating action of resistors 31, and assuming that the voltage of conductors 6 has the desired value, control winding 15c and feedback winding 15d saturate cores 15a to a predetermined extent to produce across resistor 24 a voltage equal to the voltage of voltage divider 25. Under these conditions the signal voltage component impressed on field winding 8b is zero, and assuming that the machine 8 has reached its operating temperature and that resistor 9 is so adjusted that machine 8 is fully self-excited, armature 8a supplies to field winding 7b current sufficient to maintain the voltage of conductors 6 at the desired value.

If the voltage of conductors 6 increases above the desired value, the voltage impressed on control winding 15c is increased to increase the saturation of cores 15a and thereby increase the voltage across resistor 24. The effect of this change in the voltage of conductors 6 is amplified by feedback winding 15d which has the voltage thereacross increased upon an increase in the voltage of resistor 24 to further increase the saturation of cores 15a and the voltage across resistor 24. Under these conditions the voltage of resistor 24 exceeds, the voltage of voltage divider 25 to impress on field winding 8b a signal voltage component tending to reduce the voltage of armature 8a to thereby return the voltage of conductors 6 to the desired value.

If the voltage of conductors 6 decreases below the desired value, the action of the system to return the voltage to the desired value is the converse of that described above.

Before the component elements of the regulating system reach their operating temperature or when the system is subjected to changes in ambient temperature, the resistances of the elements vary. These resistance variations are especially undesirable in feedback winding 15d and in self-excited field winding 8c, owing to the large effect of these elements on the accuracy of the system.

In Fig. 2, curve 36 is the saturation curve of machine 8 which is substantially linear over a large portion thereof. Line 37 is the field resistance line of machine 8 when the machine is a predetermined amount below its operating temperature. It will be seen that line 37 is not coincident with curve 36 under these conditions and that a predetermined number of ampere turns 38 must be subtracted from the ampere turns of field winding 8c to produce a predetermined voltage E across armature 8a. Assuming that the voltage E is the voltage required to be impressed on winding 7b to maintain the voltage of conductors 6 at the desired value, field winding 8b must have impressed thereon a voltage component which will produce in machine 8 the required ampere turns 38 when the machine 8 is the predetermined amount below its operating temperature. The voltage impressed on field winding 8b may be considered to consist of a signal voltage component produced by variations in the voltage of conductors 6 from the desired value and a compensating voltage component produced by the action of resistors 31.

Feedback winding 15d increases its resistance with temperature, so that if the resistor 20 is adjusted to provide the desired value of current through winding 15d when the winding 15d has reached its operating temperature, the winding 15d is supplied with an excess of current before winding 15d reaches its operating temperature, thereby necessitating adjustment of resistor 20.

In the embodiment of Fig. 1, the single resistance means comprising resistors 31 compensates for both of these resistance variations. Resistors 31 are imbedded in reactor 15 and therefore are subjected to substantially the same temperature as feedback winding 15d. The temperature of reactor 15 is in a predetermined relation to the temperature of field winding 8c, so that the heating of resistors 31 in reactor 15 follows to a predetermined extent the heating resistors 31 would be subjected to if the resistors were located adjacent field winding 8c. Resistors 31 are so dimensioned that the increase in resistance in feedback winding 15d occasioned by an increase in temperature of the winding is compensated for by the decrease in resistance of resistors 31 as these resistors are heated by reactor 15, and the resistors 31 also operate to cause reactor 15 to impress on winding 8b a compensating voltage component to compensate for variations in the resistance of field winding 8c.

Thus, when reactor 15 and machine 8 are the predetermined amount below their operating temperature, resistors 31 permit more current to flow through feedback winding 15d than flows through this winding when the elements have reached their operating temperature and when the voltage of conductors 6 has the desired value. This increased current produces an additional saturation of cores 15a so that the voltage across resistor 24 exceeds the voltage across voltage divider 25 to impress on field winding 8b a voltage sufficient to produce in machine 8 the additional ampere turns 38 required to produce the predetermined voltage E. As reactor 15 and machine 8 heat up and approach their operating temperatures, thereby shifting field resistance line 37 toward the linear portion of curve 36, the current through feedback winding 15d decreases to decrease the compensating voltage component supplied to field winding 8b.

When machine 8 reaches its operating temperature, the field resistance line of machine 8 has shifted into substantial coincidence with the linear portion of curve 36, as shown by the dotted line 37'. Under these conditions the compensating voltage component impressed on field winding 8b has zero magnitude. Thus, the invention operates to compensate for the resistance variations in both feedback winding 15d and field winding 8c so that the system operates to accurately regulate the voltage of conductors 6 under all temperature conditions.

Fig. 3 illustrates an alternate embodiment of the invention in which the resistance means having a negative temperature coefficient of resistance is in the form of a single resistor 31 connected in series with field winding 8c and resistor 9 to form a first circuit. Resistor 31 is in heat transfer relation with field winding 8c, as diagrammatically represented by enclosure 40, so that both of these elements are subjected to substantially the same temperature. Resistor 31 may be so dimensioned that variations in the resistance of winding 8c are exactly compensated for by variations in the resistance of resistor 31, so that the field resistance line of machine 8 is in substantial coincidence with the linear portion of the saturation curve of the machine independently of the temperature of machine 8. Also, resistor 31 may be so dimensioned that this resistor compensates for both the resistance variations in field winding 8c and the resistance variations in feedback winding 15d, as in the embodiment of Fig. 1.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. In a system for controlling an operating condition of an electric network, the combination of a dynamoelectric machine for controlling said condition, said machine having an armature, a self-energized field winding having a positive temperature coefficient of resistance and control field winding means, a connection between said armature and said self-energized field winding to form a first circuit, condition responsive means connected to said network for producing a signal voltage component which is a measure of said condition, connections between said condition responsive means and said control winding means to form a secod circuit for impressing said signal voltage component on said control field winding means, resistance means having a negative temperature coefficient of resistance, and means disposed in heat transfer relation to said condition responsive means for subjecting said resistance means to a temperature in a predetermined relation to the temperature of said self-energized field winding, said resistance means being connected to one of said circuits for causing said field winding and said control field winding means to supply all of the excitation required to maintain the voltage of said armature at any given value when said signal voltage component has zero magnitude.

2. In a system for controlling an operating condition of an electric network, the combination of a dynamoelectric machine for controlling said condition, said machine having an armature and field winding means having a positive temperature coefficient of resistance, condition responsive means connected to said network for supplying to said field winding means a signal voltage component which is a measure of said condition, resistance means having a negative temperature coefficient of resistance, and means disposed in heat transfer relation to said field winding means for subjecting said resistance means to a temperature in a predetermined relation to the temperature of said field winding means, said resistance means being connected in circuit with said field winding means to cause said field winding means to supply all of the excitation required to maintain the voltage of said armature at any given value when said signal voltage component has zero magnitude.

3. In a system for controlling an operating condition of an electric network, the combination of a dynamoelectric machine having a substantially linear saturation curve for varying said condition, said dynamoelectric machine having an armature, a self-energized field winding having a positive temperature coefficient of resistance connected in circuit with said armature and control field winding means, condition responsive means connected to said network for supplying to said control field winding means a signal voltage component which is a measure of said condition, resistance means having a negative temperature coefficient of resistance, and means disposed in heat transfer relation to said condition responsive means for subjecting said resistance means to a temperature in a predetermined relation to the temperature of said field winding, said resistance means being connected in circuit with said condition responsive means for causing said condition responsive means to supply to said control field winding means a compensating voltage compensating voltage component, whereby said machine operates on the linear portion of said saturation curve for all temperatures of said self-energized field winding within a given range when said signal voltage component has zero magnitude.

4. In combination, a dynamoelectric machine comprising an armature and a field winding having a positive temperature coefficient of resistance, the saturation curve of said machine being substantially linear over a large range thereof, resistance means having a negative temperature coefficient of resistance, means disposed in heat transfer relation to said field winding for subjecting said resistance means to a temperature in a predetermined relation to the temperature of said field winding, and connections joining said resistance means and said field winding in series with each other across said armature, whereby the field resistance line of said machine is substantially coincident with the linear portion of said saturation curve at all temperatures of said field winding.

5. In combination, a dynamoelectric machine comprising an armature and a field winding having a positive temperature coefficient of resistance, the saturation curve of said machine being substantially linear over a large range thereof, resistance means having a negative temperature coefficient of resistance, means disposed in heat transfer relation to said field winding for subjecting said resistance means to a temperature in a predetermined relation to the temperature of said field winding, and connections joining said resistance means and said field winding in series with each other in circuit with said armature, whereby the field resistance line of said machine is substantially coincident with the linear portion of said saturation curve at all temperatures of said field winding.

6. In a system for controlling an operating condition of an electric network, the combination of a dynamoelectric machine for varying said condition, said machine having an armature, a self-energized field winding having a positive temperature coefficient of resistance and control field winding means, means connecting said field winding across said armature, condition responsive means having a positive temperature coefficient of resistanct connected to said network and to said control field winding means for impressing on said control field winding means a signal voltage component which is a measure of said condition, resistance means having a negative temperature coefficient of resistance, and means disposed in heat transfer relation to said condition responsive means for subjecting said resistance means to a temperature in a predetermined relation to the temperatures of said condition responsive means and of said field winding, said resistance means being connected to said condition responsive means for varying the energization of said control field winding means in response to variations in the temperature of said condition responsive means to compensate for variations with temperature of the resistances of said field winding and of said condition responsive means.

7. In a system for controlling an operating condition of an electric network, the combination of a condition responsive device connected to said network for producing a signal voltage component which is a measure of said condition, a controlling device connected to said condition responsive device to be energized by said signal voltage component for varying said condition, said condition responsive device and said controlling device having positive temperature coefficients of resistance, resistance means having a negative temperature coefficient of resistance, means for subjecting said resistance means to a temperature in a predetermined relation to the temperatures of said condition responsive device and of said controlling device independently of the ambient temperature and of the magnitude of said signal voltage component, and means connecting said resistance means to one of said devices to vary the energization of said controlling device in response to variations in the temperatures of said condition responsive device and of said controlling device to compensate for variations with temperature of the resistances of said condition responsive device and of said controlling device.

References Cited in the file of this patent

UNITED STATES PATENTS

| Number | Name | Date |
|---|---|---|
| 1,094,733 | Lyle | Apr. 28, 1914 |
| 1,411,311 | Sullivan | Apr. 4, 1922 |
| 1,621,452 | Benit | Mar. 15, 1927 |
| 1,622,282 | Hulse | Mar. 29, 1927 |
| 1,874,163 | Bergvall | Aug. 30, 1932 |
| 1,948,372 | Fitzgerald | Feb. 20, 1934 |
| 2,066,943 | Philpott | Jan. 5, 1937 |
| 2,100,854 | Kaufmann | Nov. 30, 1937 |
| 2,337,253 | Lamm | Dec. 21, 1943 |
| 2,354,119 | Harding | July 18, 1944 |
| 2,423,114 | Potter | July 1, 1947 |
| 2,435,573 | Bixby | Feb. 10, 1948 |
| 2,447,655 | Kirshbaum | Aug. 24, 1948 |
| 2,467,856 | Rich | Apr. 19, 1949 |
| 2,486,250 | Bixby | Oct. 25, 1949 |
| 2,498,268 | Harder | Feb. 21, 1950 |